Figure 6:
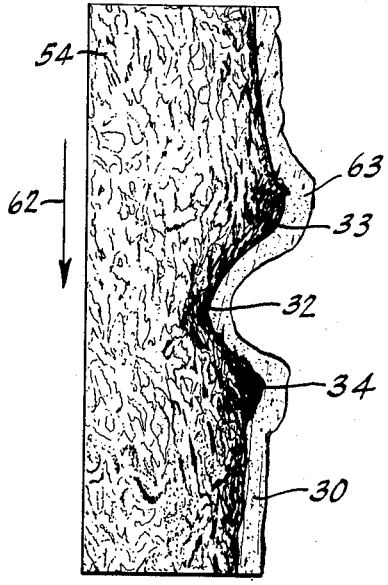

Nov. 6, 1962
A. J. STOECKERT ET AL
3,062,981
ELECTRON TUBE STEM CONDUCTORS HAVING
IMPROVED SURFACE WETTABILITY
Filed Feb. 24, 1959
2 Sheets-Sheet 1
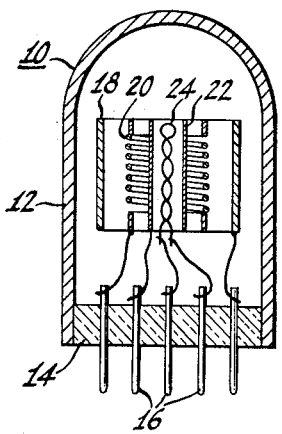
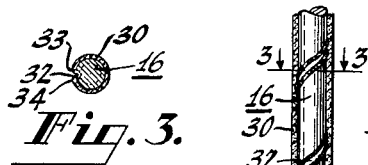
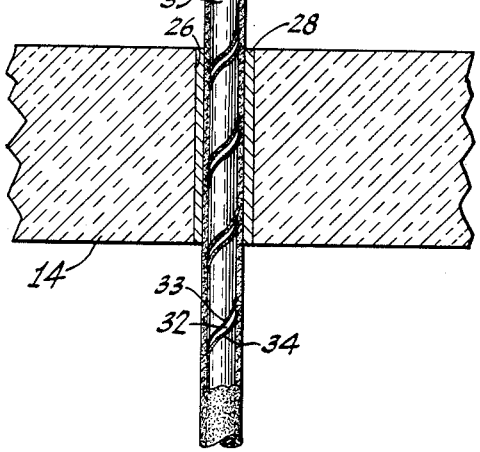
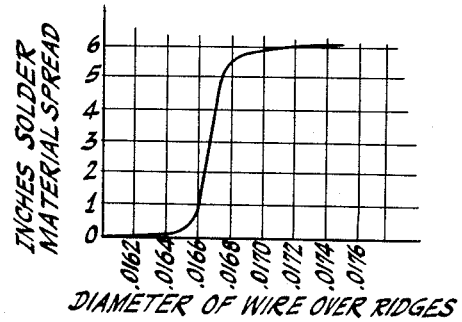
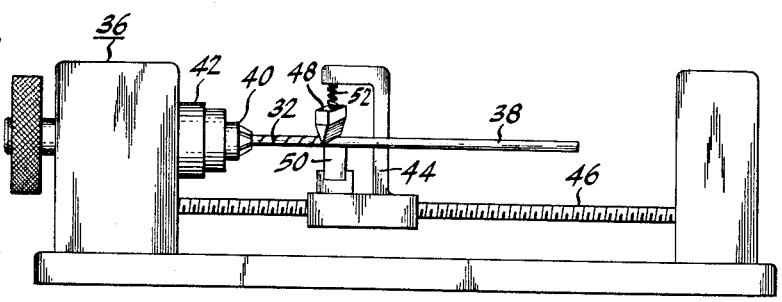
INVENTORS
ALVIN J. STOECKERT &
JOHN J. CARRONA
BY
William A. Zalesak
ATTORNEY Nov. 6, 1962

A. J. STOECKERT ET AL
ELECTRON TUBE STEM CONDUCTORS HAVING
IMPROVED SURFACE WETTABILITY 3,062,981

Filed Feb. 24, 1959

2 Sheets-Sheet 2

INVENTORS
ALVIN J. STOECKERT &
JOHN J. CARRONA
BY
William A. Zalesak
ATTORNEY

United States Patent Office 3,062,981
Patented Nov. 6, 1962

3,062,981
ELECTRON TUBE STEM CONDUCTORS HAVING IMPROVED SURFACE WETTABILITY
Alvin J. Stoeckert, Cedar Grove, and John J. Carrona, Plainfield, N.J., assignors to Radio Corporation of America, a corporation of Delaware
Filed Feb. 24, 1959, Ser. No. 794,942
3 Claims. (Cl. 313—289)

This invention relates to vacuum-tight brazed ceramic-to-metal seals and particularly to metal elements such as lead-in conductors having improved surface wettability to brazing materials for use in ceramic-to-metal electron tube stem assemblies.

It is often desired to seal a wire conductor vacuum tight within a bore or aperture of a ceramic member to provide an electrical lead-in for a vacuum-tight enclosure such, for example, as used in electron discharge devices. It is known to provide an adherent metallic coating on the wall of the bore through the ceramic member, usually a disk, dispose the wire conductor through the bore, and solder or braze it to the metallic coating. This procedure requires that brazing material disposed on or around the conductor at the bore of the ceramic be melted and caused or permitted to flow therealong to within the bore where the brazed seal is to be made. Also, both the wire conductor and the metallic coating on the ceramic must be surface wetted by the brazing material.

One of the major difficulties in the fabrication of brazed ceramic-to-metal electron tube stem assemblies is the obtaining of vacuum-tight stem seals with the limited brazing schedules which can be employed. Although good seals of molybdenum conductors can be made by brazing, e.g., at 1200° C. for 5 minutes, other factors dictate that a brazing schedule not more severe than 1130° C. for 2 minutes be used. At higher temperatures or longer periods of time, the tube mount structure alloys with molten brazing solder and becomes deformed beyond use. However, according to prior art techniques and structures, when stems are brazed at only 1130° C. for only 2 minutes it is extremely difficult, if not at times impossible, to obtain a flow of brazing material into the bore of the ceramic header where the brazed seal is to be made. Moreover, at these less severe brazing conditions the molybdenum conductors are often not completely surface-wetted by the molten brazing solder. This results in clearance spaces between the conductors and the ceramic stem member through which leaks develop. Thus, the vacuum-tight conditions, which are necessary to electron tube structures, are not obtained.

It is therefore generally the object of our invention to provide improved ceramic-to-metal seals, such as in electron tube stem assemblies. Particularly, it is an object of our invention to provide lead-in conductors for such assemblies wherein the conductors have improved surface wettability and solder flow characteristics which facilitate brazing so as to insure a vacuum-tight brazed seal thereof.

According to the invention, a metallic element such as a molybdenum lead-in conductor to be sealed in a ceramic header to provide an electron tube stem is grooved along its cylindrical surface. The groove or grooves are of such dimension as to provide capillary flow along the conductor of a suitable solder, e.g., molten copper or silver, used to seal the conductor through the metallized ceramic header to form a stem. The grooves are so mutually spaced as to provide a complete wetting of the conductor by the solder material over a desired portion thereof.

Figure 7:
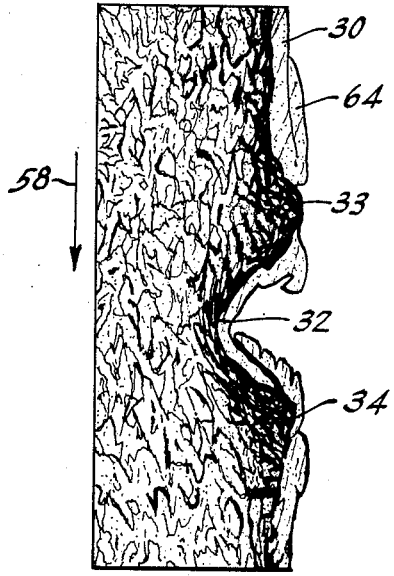
Figure 8:
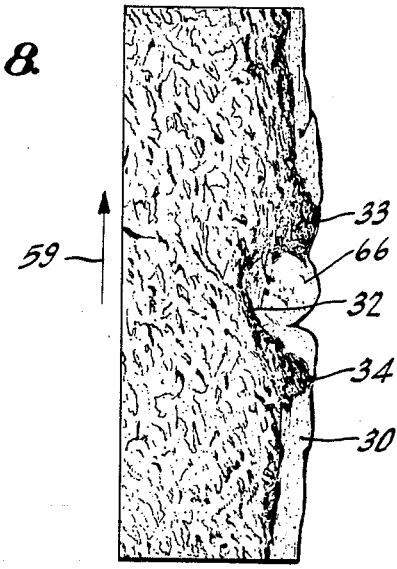

In the drawings:
FIG. 1 is a vertical section of an electron tube embodying our invention;
FIG. 2 is an enlarged detail view in section of a portion of the tube of FIG. 1 and illustrating the invention;
FIG. 3 is a transverse section taken on line 3—3 of FIG. 2;
FIG. 4 is a graph illustrating the relationship between groove size and surface wettability;
FIG. 5 is a partially schematic elevation view of apparatus suitable for grooving wire conductors according to our invention; and
FIGS. 6, 7, and 8 are highly magnified reproductions of photographic views of grooved wire conductors, according to the invention, illustrating different stages of their fabrication.

In FIG. 1 we show an electron tube 10 embodying our invention. The tube 10 comprises a cup-shaped metallic envelope 12 closed at its open end with a planar ceramic stem disk 14 through which a plurality of metallic wire lead-in conductors 16 are sealed. Within the envelope 12 are disposed concentric, tubular anode, grid, and cathode electrodes 18, 20, and 22, respectively. A heater coil 24 is disposed within the tubular cathode 22. The electrodes 18 to 24 inclusive are supported in a conventional manner upon and electrically connected to different ones of the lead-in conductors 16.

According to the invention each of the lead-in conductors 16 is surface grooved and soldered to a metallic coating on the ceramic stem 14.

In FIG. 2 a single lead-in conductor 16 and the surrounding portion of the ceramic stem 14 to which the lead 16 is sealed is shown. The stem 14 is provided with a lead-in receiving bore 26 which is internally coated with an adherent metallic layer 28. Such adherent metallic layer may be provided by any means known to the art, such as sintering molybdenum compounds onto the surface of the ceramic. To seal the lead-in conductor 16 vacuum tight within the bore 26, the lead-in 16 is provided with a coating 30 of a suitable solder material, e.g., copper or silver or any of the so-called hard or soft solders. Such coating 30 may, for example, be applied by electroplating of the solder or brazing material onto the lead-in conductor 16. Alternatively, the solder material may be applied to the lead-in conductor 16 in the form of a ring or washer (not shown) disposed adjacent to a flat surface of the ceramic disk 14 and permitted to flow into the bore 26 during the soldering operation. In either event, the actual vacuum-tight seal is made by heating the assembly of the ceramic disk 14 and the lead-in conductor 16 to a temperature sufficient to melt the solder material. This causes the solder to flow along the conductor 16 into the bore 26 and to surface wet the conductor 16 and the metallic coating 28 throughout the extent of their opposed surfaces. A vacuum-tight seal is formed upon cooling. Such soldering techniques are conventional and well-known in the art.

In accordance with our invention solder flow along the conductor 16 into the bore 26 and surface wetting of the conductor 16 by the solder material 30 is greatly enhanced by the provision of a groove or grooves 32 along the surface of the conductor 16. We have found that such grooving results in lowering the required brazing temperature from about 1200° C. to 1130° C. and the time necessary for brazing from about 5 minutes to 2 minutes. We have also found that the seals made with our grooved conductors are substantially always vacuum tight.

The graph of FIG. 4 was plotted from data taken from tests wherein a wire lead-in 16 of approximately 0.0162 inch diameter was grooved at various depths by a method which will be hereinafter described with reference to FIG. 5. Such grooving resulted in forcing the metal originally occupying the space of the groove outwardly into ridges 33 and 34 on each side of the groove 32. This also increased the overall diameter of the lead-in conductor 16 as measured over the ridges 33 and 34. The deeper the groove is made, the higher the ridges formed, and the greater the overall diameter of the lead-in conductor 16. The depth of groove in the test recorded in the graph of FIG. 4 was measured as a function of the increased diameter of the lead-in conductor 16.

In these tests the ungrooved wire had a diameter of approximately 0.0162 inch. In the graph the resultant overall diameter is shown along the abscissa. The greater this diameter measurement, the greater the depth of groove. The ordinate of the graph represents the distance along a grooved wire 16 which molten solder material flowed and produced a surface wetted condition thereof within a given time period. It will be noted that very little flow and surface wetting exists until a groove depth providing increased wire diameter of 0.0166 inch is obtained. An unexpected increase occurs at this point and increases rapidly to a groove depth sufficient to provide a diameter of the conductor of 0.0168 inch. From this point on, wettability increases only slightly with increased depth of the groove. The wetting of the lead-in conductor 16 is not confined to the grooves 32 therein, but rather is spread over the entire surface of the conductor, including the areas 35 between the grooves 32. It is this unexpected feature of our discovery which makes the process of grooving a practicable way of obtaining surface wetting.

While we are not exactly certain why grooving results in such unexpected and rapid surface flow and wetting by the solder, we believe it to be mainly due to capillarity. It appears that flow of the solder along the conductor is enhanced when grooving of a capillary dimension is provided. This is evidenced both by the results of the tests described with reference to FIG. 4 and by experience in actual fabrication of electron tube stems as illustrated in FIG. 2. In any event it is certain that grooving permits solder to flow along the conductor and into the bore of a ceramic stem disk under brazing conditions where it otherwise would not if the conductor were not grooved. This in itself solves a serious problem present in prior art structures and brazing techniques. Regarding the enhanced surface wettability produced by grooving, experience shows that this also results when the grooving is such as to produce capillarity. Surface tension forces which inhibit surface wetting are apparently broken down at the grooves by virtue of their capillary qualities. The surface wetted condition then easily spreads a substantial distance beyond the sides of the grooves into the areas therebetween. If the grooves or turns of a single helical groove are sufficiently close together the entire surface of the conductor will be surface wetted. As with the question of solder flow along the conductor, regardless of the cause it is certain that grooving will promote surface wetting under given brazing conditions where such wetting would not otherwise occur in the absence of grooving.

In FIG. 2 the grooving 32 of the lead-in conductor 16 is shown to comprise a single groove helically provided around and along the lead-in 16. However, this by no means represents a limitation of the manner in which grooving may be applied to metallic element. Instead, the groove 32 may comprise a double bifilar helix, a pair of crossed single helices grooved in opposite directions, straight longitudinal flutes, or other shapes. The single helical grooving 32 illustrated in FIG. 2 represents a preferred embodiment with regard to use in electron tube stems of a particular relationship of part sizes. Such particular application of the invention will be hereinafter discussed.

FIG. 5 illustrates one type of apparatus and method suitable for providing the groove 32 according to our invention. In the arrangement shown in FIG. 5 a conventional lathe 36 is employed. A wire length 38 to be grooved is clamped by a suitable chuck 40 in the head stock 42 of the lathe 36 so that the wire 38 may be rotated. A carriage 44, geared to the lead screw 46 of the lathe, supports a spring loaded grooving tool 48 and a backing block 50 of suitable material, e.g., Teflon. The grooving tool 48 comprises a simple V-shaped knife-like member which is disposed at an angle relative to the longitudinal axis of the wire 38.

In the grooving operation, the grooving tool 48 is placed against the top of the wire 38, the wire 38 rotated by driving the head stock 42; the carriage 44 is moved longitudinally along the wire 38 by the lead screw 46. Thus, a single helical groove 32 is provided along the wire 38. In order to provide as sharp a groove as possible, the angle between the knife edge of the grooving tool 48 and the axis of the wire 38 is adjusted to approximately coincide with the angle of the line of the groove 32 relative to the axis of the wire 38. This latter angle, of course, is a function of the diameter of the wire 38 and the turns per inch of the groove 32. With a wire having a diameter of 0.0162 inch and a groove of 18 turns per inch, this angle is approximately 60°. In the apparatus of FIG. 5 the spring loading 52 of the grooving tool 48 determines the depth of the groove 32.

FIGS. 6, 7, and 8 are reproductions of micro-photographs of the wire conductor 16 grooved, according to the invention, and wherein different and alternative stages or fabrication treatment of the wire is illustrated. In each of the three FIGS. 6–8, the grooved lead-in wire is magnified approximately 500 times. In FIG. 6 a specimen is shown to comprise a molybdenum element 54 having a groove 32 in the surface thereof and a copper plate coating 30 thereon.

Experience has shown that after so grooving and plating a lead-in wire, it is preferred that the wire be drawn through a sizing die to remove burrs and generally provide a control of the diameter thereof. FIGS. 7 and 8 illustrate the effects of drawing the wire through the sizing die in opposite directions as indicated respectively by the arrows 58 and 59.

In FIG. 6 it will be noted that the groove 32 has a higher ridge 33 on one side thereof than the ridge 34 on the other side. In accordance with the grooving method of FIG. 5, the higher ridge 33 is provided by virtue of drawing the wire relative to the grooving tool as indicated by the arrow 62. In so doing the majority of wire material displaced to form the groove is piled up on the wire on the side of the grooving tool facing he ungrooved wire.

FIG. 7 illustrates the effect of moving the wire through the sizing die in the same direction as the wire was moved in providing the groove. As illustrated, this causes the copper coated crest 63 (FIG. 6) of the high ridge 33 to be scrapped away from the groove 32 producing an objectionable sliver 64 of copper.

FIG. 8 shows the effect of drawing the wire through a sizing die in a direction opposite to that in which the wire is moved during grooving. As illustrated in FIG. 8, this results in the copper coated crest 63 (FIG. 6) being scrapped into the groove 32 and forming a mass of copper 66 therein. In the particular application of a lead-in stem assembly illustrated in FIG. 2, the sizing operation described with reference to FIG. 8 is most satisfactory. However, in either the operation of FIG. 7 or the operation of FIG. 8 neither surface flow nor wettability is not materially effected over the unsized condition illustrated in FIG. 6.

Various factors have been found to influence surface flow and wettability within the practice of the invention. Best results are obtained if the groove 32 is a relatively sharp V-groove. It is believed that a less shallow groove provides better capillarity. Accordingly, grooving with a sharp V-groove tool has been found to be quite desirable.

It has also been found that the lower the turns per inch of a helically grooved wire, the faster the flow of the solder and the wetting of the surface. In the particular stem assembly of FIG. 2, a turns per inch ratio of 18 is preferred. This then provides a groove along the lead-in 16 axially spaced approximately 0.055 inch. With a ceramic stem disk 14 of 0.100 inch thickness, approximately two complete grooving turns are provided in contact with the bore 26. This prevents excessive tilting which might occur with a lower turns per inch ratio in the particular assembly of FIG. 2.

A turns per inch ratio of 18 on the 0.0162 inch diameter wire 16 also has proved to provide complete spread of surface wetting of the brazing material between the grooves 32 over the intermediate areas 34 of the lead-in 16. A single pair of diametrically opposite straight fluted grooves has also provided complete wetting of copper solder material over a 0.0162 inch diameter molybdenum wire.

It will be appreciated that, although the invention has been described with regard to a stem assembly for an electron tube utilizing ceramic-to-metal seals, the invention can be utilized in other ways.

What is claimed is:

1. An electron tube stem assembly comprising a ceramic member having a bore therethrough, an adherent metallic coating on the wall of said bore, a cylindrical metallic conductor disposed through said bore and soldered by a solder material to said metallic coating, said conductor having a helical groove in the soldered region thereof, said groove being of capillary dimensions with respect to said solder material.

2. An electron tube comprising a vacuum-tight envelope, electrodes disposed within said envelope, said envelope including a stem assembly comprising a ceramic member having a plurality of bores therethrough, an adherent metallic coating on the wall of each of said bores, and a plurality of metallic conductors disposed within said bores, a solder material bonding said conductors to said metallic wall coatings with a vacuum tight seal, said conductors being electrically connected to said electrodes, each of said conductors having a groove along the soldered surface thereof to enhance surface flow along said conductors and surface wettability of said conductors with respect to said solder in its molten state.

3. An electron tube according to claim 2 and wherein said conductors are cylindrical and helically grooved.

References Cited in the file of this patent
UNITED STATES PATENTS

| | | |
|---|---|---|
| 247,084 | Maxim | Sept. 3, 1881 |
| 2,629,922 | Finch | Mar. 3, 1953 |
| 2,812,466 | Murdock | Nov. 5, 1957 |

FOREIGN PATENTS

| | | |
|---|---|---|
| 811,509 | Great Britain | Apr. 8, 1959 |